United States Patent [19]
Rex et al.

[11] Patent Number: 5,887,539
[45] Date of Patent: Mar. 30, 1999

[54] BOAT MOUNTED BLIND

[76] Inventors: James William Rex, 1803 Wimbledon Dr., Thomasville, Ga. 31792; Dale Allen Moehle, 7363 Hall Rd., Coolidge, Ga. 31738

[21] Appl. No.: 74,028

[22] Filed: May 6, 1998

Related U.S. Application Data

[60] Provisional application No. 60/048,422 Jun. 3, 1997.

[51] Int. Cl.$^6$ ..................................................... B63B 35/00
[52] U.S. Cl. .......................................... 114/351; 114/364
[58] Field of Search .................................. 114/343, 351, 114/362, 364; 43/1

[56] References Cited

U.S. PATENT DOCUMENTS

| | | |
|---|---|---|
| D. 339,640 | 9/1993 | Alberico . |
| 2,816,297 | 12/1957 | Stanley ..................................... 114/351 |
| 2,889,839 | 6/1959 | Sheriden, Jr. ............................ 114/351 |
| 4,106,145 | 8/1978 | Gillen et al. . |
| 4,186,507 | 2/1980 | Stinnett . |
| 4,388,939 | 6/1983 | Barton . |
| 4,593,641 | 6/1986 | Adams et al. ........................... 114/351 |
| 4,671,203 | 6/1987 | Sanburg . |
| 4,979,456 | 12/1990 | Steward . |
| 5,458,079 | 10/1995 | Matthews et al. . |

*Primary Examiner*—Stephen Avila
*Attorney, Agent, or Firm*—Brian D. Bellamy

[57] ABSTRACT

A collapsible boat mounted blind having a front bow and a rear bow pivotally attached to the side rails of a boat for forward and rearward vertical pivoting movement about a horizontal axis between a first blind down position and a second blind opened position. The blind further includes a pair of front and rear posts each pivotally attached to each side rail for forward and rearward vertical pivoting movement. A pair of connecting means attached to the respective front post and the respective rear post connects the posts in an upright position and are capable of being manually connected and disconnected. Cables provide tension between the front bow and front angle posts and the rear bow and rear angle posts when the connecting means are connected to hold the bows and angle posts in relative fixed positions. A blind material attaches to the structure and the boat using nylon tie straps.

5 Claims, 11 Drawing Sheets

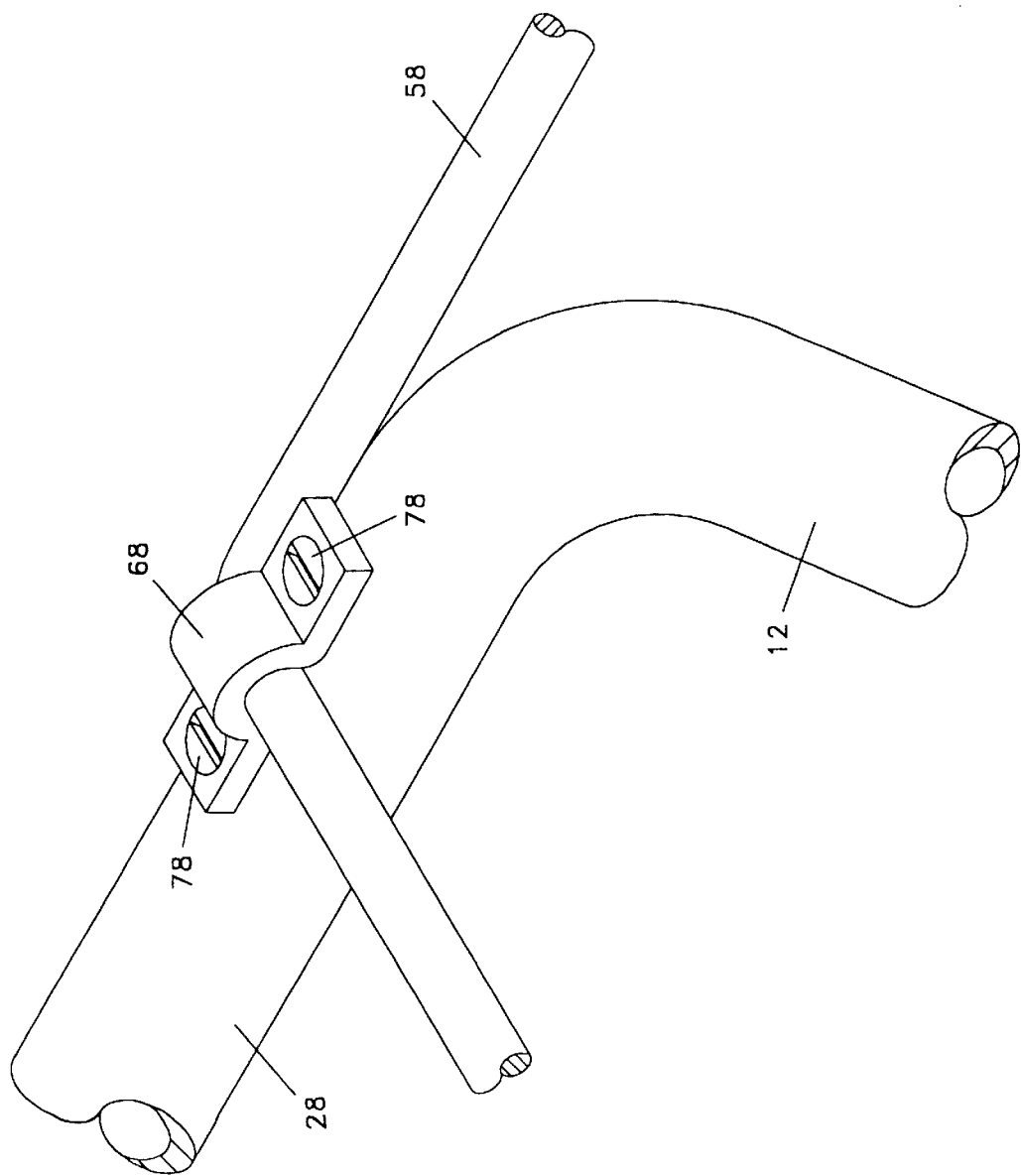

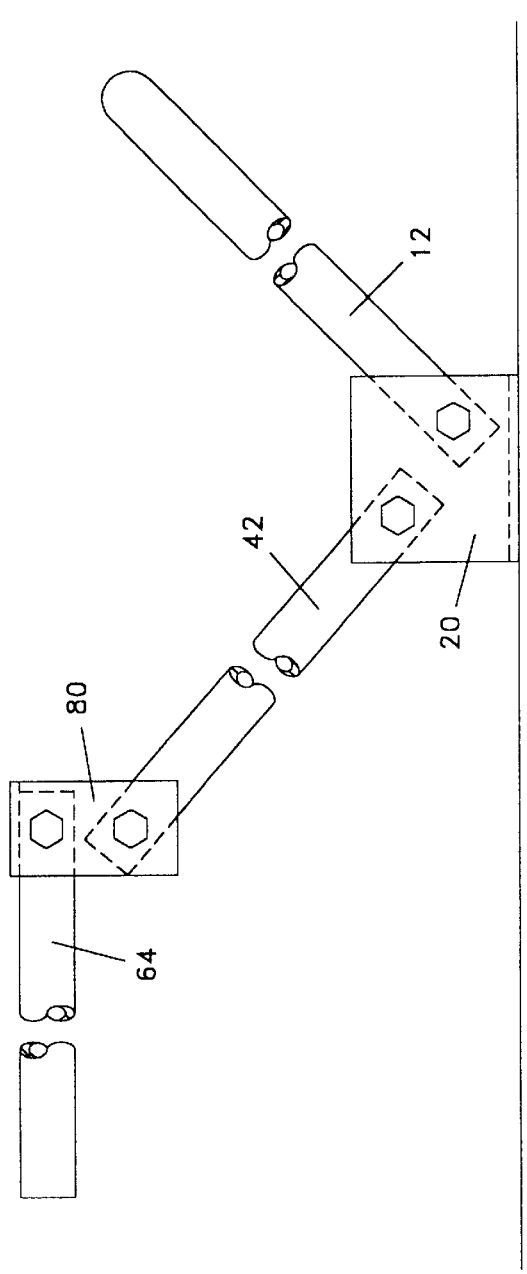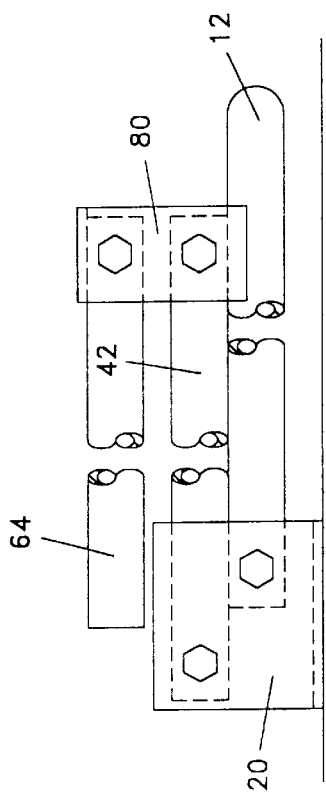
FIG. 10
FIG. 11

BOAT MOUNTED BLIND

This application claims the benefit of U.S. Provisional Application No. 60/048,422, filed Jun. 3, 1997.

INTRODUCTION

This invention relates to a blind for use in hunting waterfowl by boat, more particularly a blind adapted to being quickly raised and lowered while in use on a boat and being easy to install.

Hunters use boat mounted blinds for concealment when hunting waterfowl. When hunting waterfowl by boat, the hunter usually trails a boat to a location for launching and then navigates the boat to the desired location for hunting, often during the early morning while still dark. Once at the hunting location, the hunter will often deploy decoys to lure the waterfowl into the hunting area. After shooting the waterfowl, the hunter will sometimes desire to release a dog from the boat to retrieve the waterfowl. Each of these tasks present obstacles to a hunter when using a boat mounted blind to hunt waterfowl. The provision of a boat mounted blind that overcomes the obstacles presented to a hunter using the blind is the overall object of the present invention.

Several of the features of boat mounted blinds that are desirable to waterfowl hunters are easy operation while hunting, partial collapsibility for convenience in deployment of decoys and release of dogs, full collapsibility for safety in trailing the boat and driving the boat on water, easy removal for storage of the blind during the off-season, and adaptability to a variety of boat sizes and types.

Some attempts have been made to provide one or more of the aforementioned features. On example of a boat mounted blind that provides some of the desired features is shown in U.S. Pat. No. 5,458,079 issued Oct. 17, 1995 to Matthews et al. Other examples of boat mounted waterfowl blinds are shown in U.S. Pat. No. 4,979,456 to Steward; U.S. Pat. No. 4,671,203 to Sanburg; and U.S. Pat. No. 4,106,145 to Gillen et al. Each of these prior art devices do not provide one or more of the features provided by the present invention.

Accordingly, one object of the present invention is to provide a boat mounted waterfowl blind that suits the needs of a hunter and provides each of the desirable features described above that are not fully provided by the known prior art.

In particular it is an object of the present invention to provide a boat mounted blind that can be quickly collapsed on one side for deploying decoys or releasing a dog into the water.

Another object of the invention is to provide a blind that easily can be fully collapsed for safely trailing the boat or driving the boat on water.

Another object of the invention is to provide a blind that is simple to remove for storage.

A further object of the invention is to provide a blind that is adaptable to a variety of boat sizes and types.

These and further objects of the invention will be apparent from the following description of preferred embodiments thereof.

BRIEF SUMMARY OF THE INVENTION

The hunting blind of the present invention provides a blind easy to install on the side rails of a boat and that can be quickly lowered and raised while in use. The blind's frame incorporates a front bow that is pivotally attached to the boat side rails toward the front end of the boat and a rear bow that is pivotally attached toward the rear end of the boat. Four posts are pivotally attached to the boat side rails and have attached a means for connectig the posts together and locking them into place and supporting the posts in upright positions. The bows and the posts are further supported uprightly by cables, ropes, straps, or similar means that connect to the posts and bows, and are attached at the ends of boat. The blind frame supports a camoflage covering material that is attached to the frame. The blind frame and coverial material can be lowered by disconnecting the means for connecting the posts together.

BRIEF DESCRIPTION OF THE DRAWINGS

FIG. 7 is an enlarged perspective view taken along line 7—7 of FIG. 5 showing a preferred means of attaching a cable of the present invention to a bow.

FIG. 10 is a side view showing the pivot base and the assembly of a bow and a post in a first alternate position.

FIG. 11 is a side view showing the pivot base and the assembly of a bow and a post in a second alternate position.

DETAILED DESCRIPTION

Figure 1:
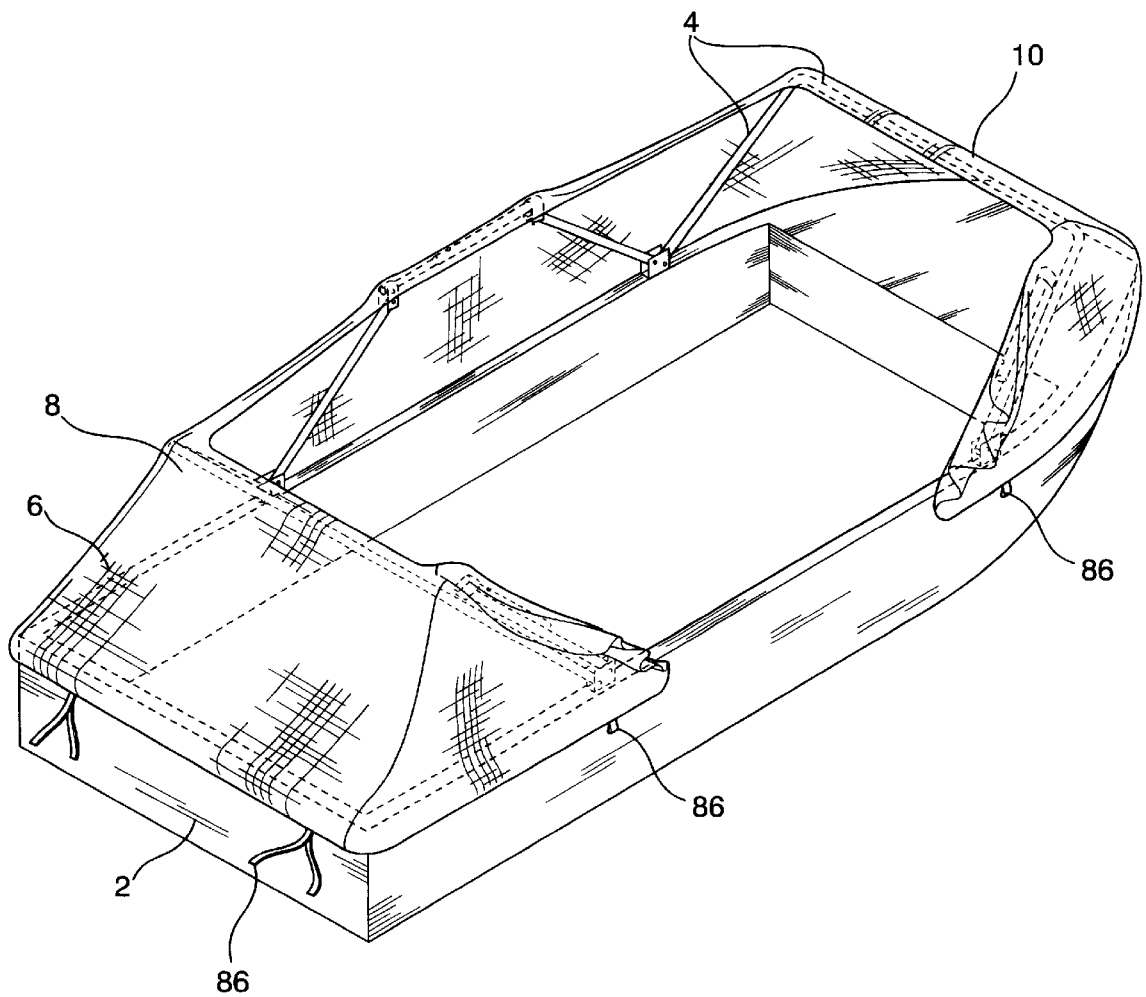
FIG. 1 is a perspective view of the blind of the present invention shown with camouflaged covering and partially collapsed.

A hunting blind for mounting on a boat 2 of the general type having a collapsible blind frame 4, but which incorporates a preferred embodiment of the present invention, is shown generally in FIG. 1 in a partially collapsed condition. The blind includes a camouflage covering material 6 having a rearward portion 8 and forward portion 10 that overlap and cover the blind frame. When partially collapsed as shown in FIG. 1, an opening in the blind on one side of the boat is formed that allows the hunter a convenient outlet to set decoys into the water or to release a dog to retrieve waterfowl.

Figure 2:
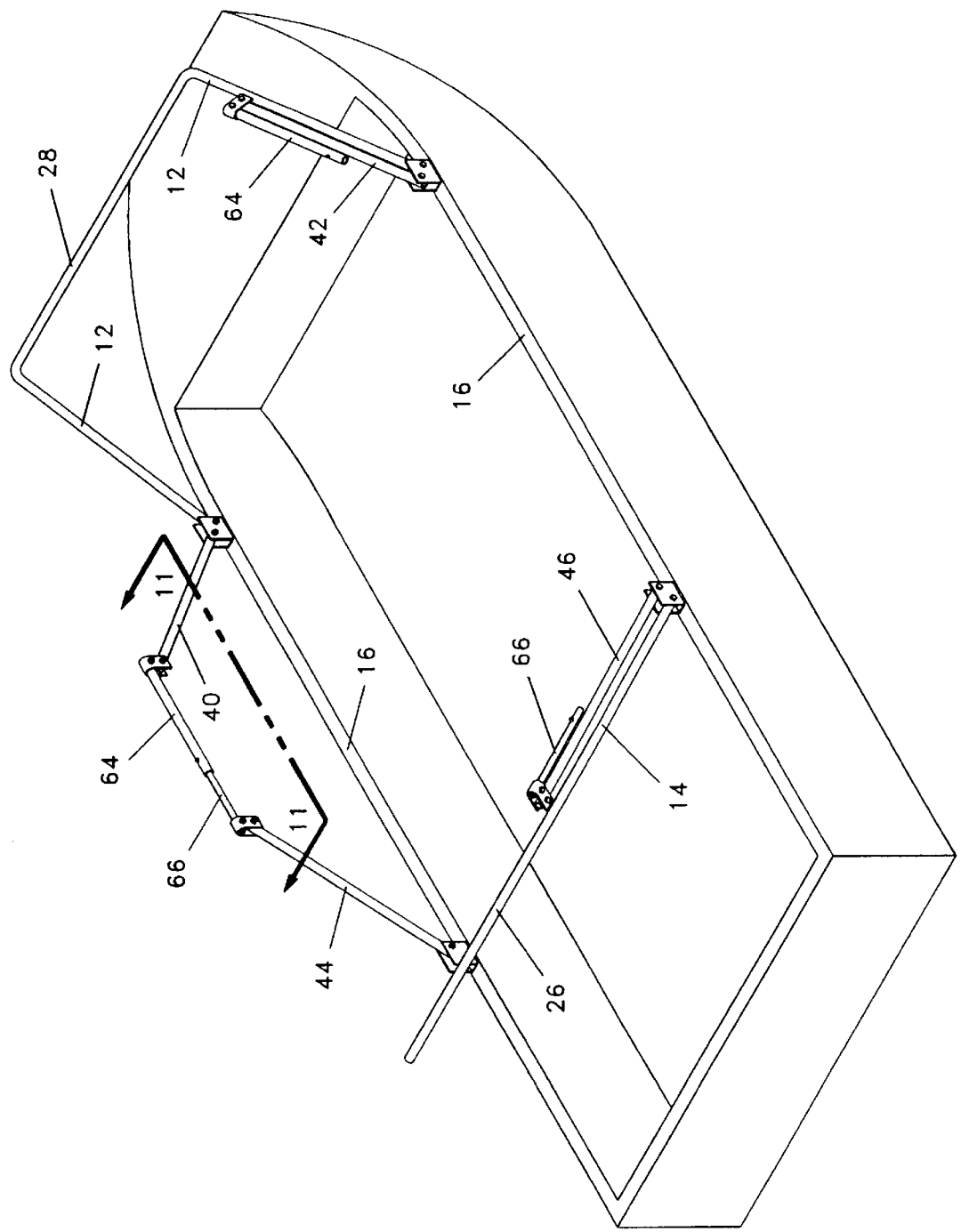
FIG. 2 is a perspective view of the blind frame of the present invention mounted on a boat and shown partially collapsed.
Figure 3:
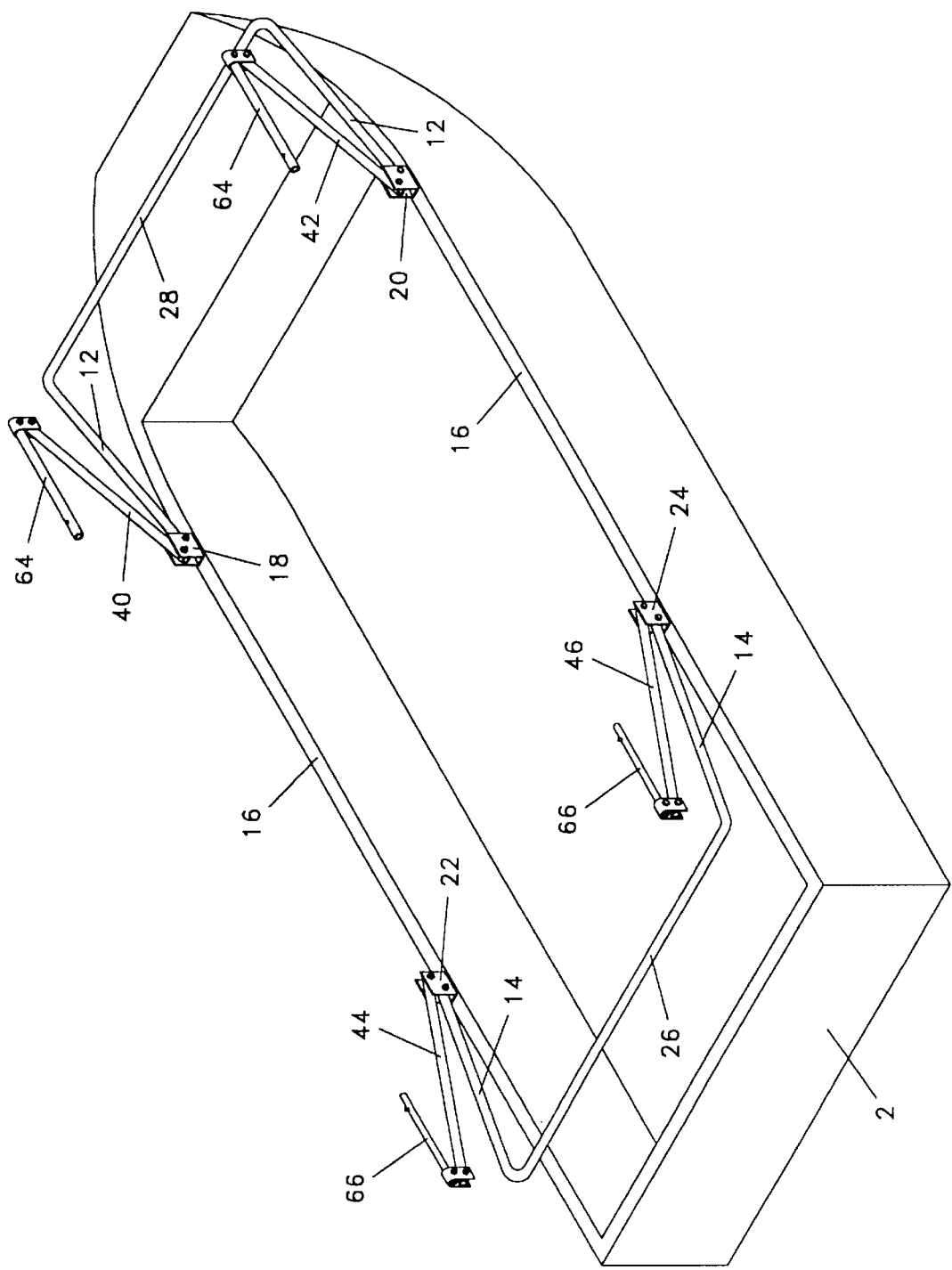
FIG. 3 is a perspective view of the blind frame of the present invention shown mounted on a boat and fully collapsed.
Figure 4:
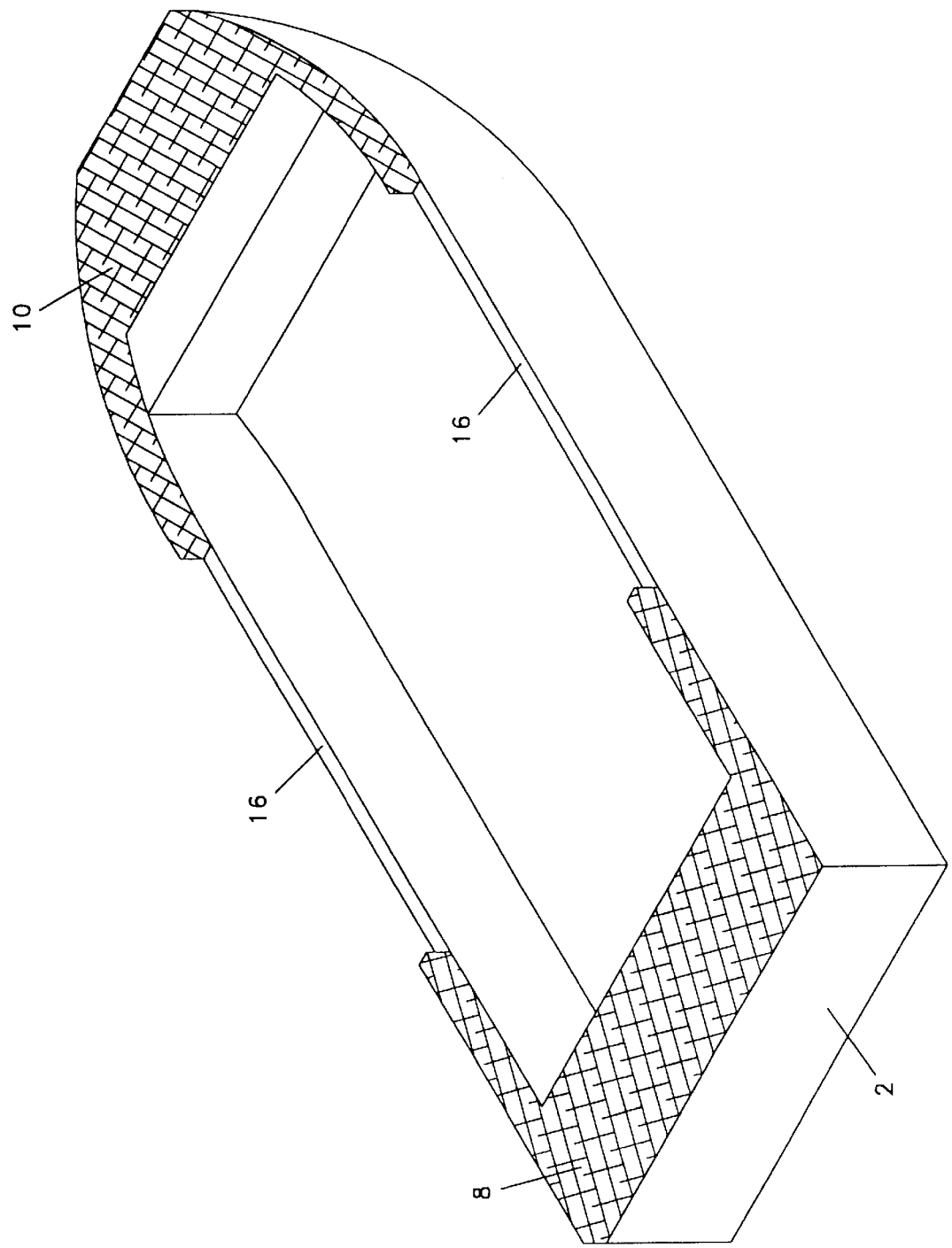
FIG. 4 is a perspective view of the blind of the present invention with camouflaged covering and fully collapsed.
Figure 12:
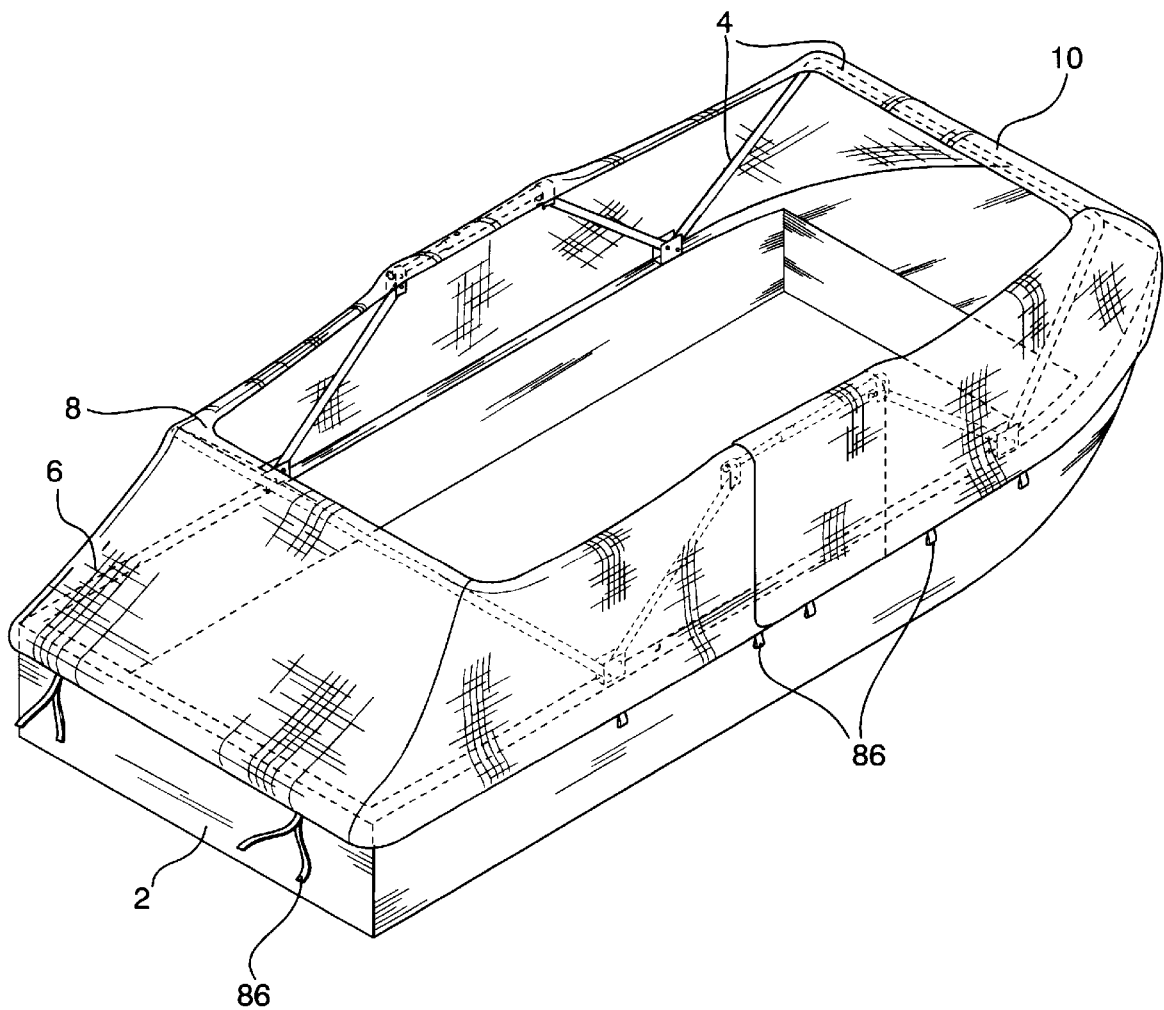
FIG. 12 is a perspective view of the blind of the present invention with camouflaged covering and fully raised.

FIG. 2 shows the partially collapsed blind frame 4 without the camouflage covering material 6. The blind includes a front bow 12 and a rear bow 14 that are pivotally mounted to side rails 16 of the boat 2. One means of pivotally mounting the bows is by the use of four pivot bases 18, 20, 22, and 24. The bows are mounted in opposing relationship to each other such that when the blind is raised or only partially collapsed a cross member 26 of the rear bow is upwardly positioned toward the aft, also referred to herein as the rear, of the boat and a cross member 28 of the front bow is upwardly positioned toward the fore, also referred to herein as the front, of the boat. When completely raised to a preselected height, the blind surrounds the entire boat with a shroud of camouflage covering material 6 as shown in FIG. 12. FIGS. 3 and 4 show the blind frame in a fully collapsed position with and without the covering material.

In the preferred embodiment disclosed, the front bow 12 is located and mounted on the side rails 16 of the boat such that when the front bow is in the down position shown in FIG. 3 the cross member 28 lies several inches from the front of the boat 2. The rear bow 14 is located and mounted on the sides of the boat such that when the rear bow is in the down position as shown in FIG. 3 the cross member 26 lies several inches from the rear of the boat. The distances of the cross members 26 and 28 from the ends of the boat 2 are not critical. The object of positioning the cross members slightly away from the ends of the boat is to promote the proper covering of the boat and strong support of the covering material by the blind frame 4. The bows 12 and 14 could be located somewhat differently to enable proper fitting of the bows on the sides 16. The location of the bows may vary depending on either size of the boat, the type of boat hull, or the type of boat deck. The blind of the present invention can be used on boats having various hull designs including, but not limited to, a v-hull, modified v-hull, or flat hull. The blind can also be used on boats having various deck designs and is not limited to any particular boat deck type. Various manners of mounting the bows will be obvious to those skilled in the art and are intended to be encompassed by the preferred manner described.

In the depicted embodiment, the pivot bases 18 and 20 to which the front bow 12 are attached are mounted on the side rails such that each are the same distance from the front of the boat 2. Similarly, the pivot bases 22 and 24 to which the rear bow 14 is attached are mounted such that each is the same distance from the rear of the boat. Positioning the pivot bases as described above promotes evenness in the blind when lowered and raised and reduces twisting. In the preferred embodiment, the pivot bases are mounted to the boat side rails using screws 32, although any suitable attaching means could be used.

Figure 5:
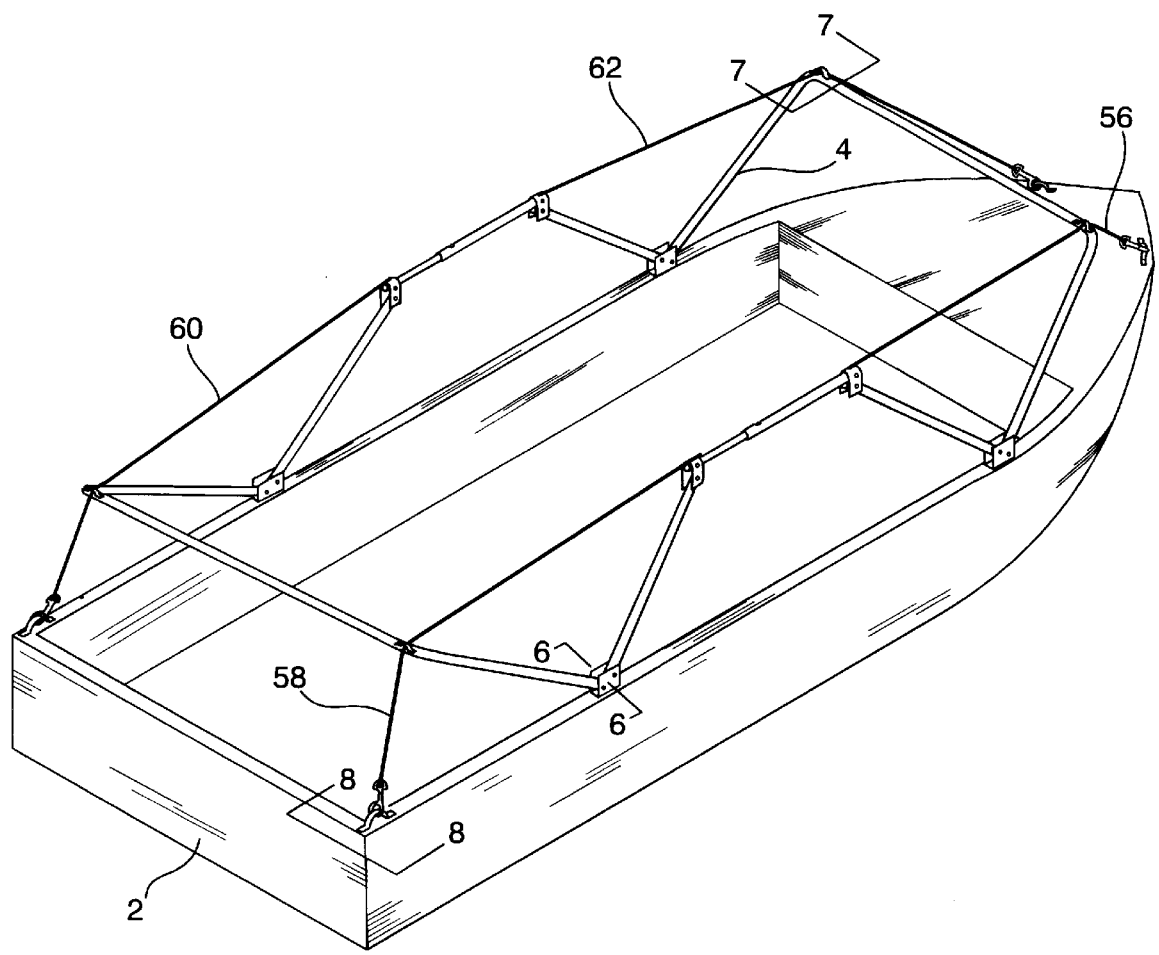
FIG. 5 is a perspective view of the blind frame of the present invention mounted on a boat and shown completely raised.
Figure 6B:
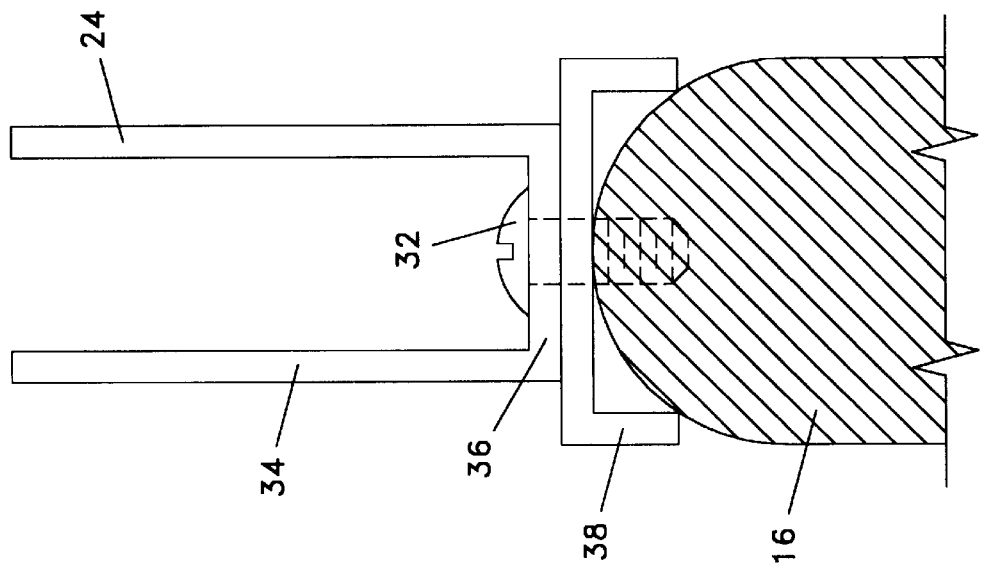
FIGS. 6A and 6B are enlarged end views taken along line 6—6 of FIG. 5 showing the alternative mounting of the pivot base in the present invention.
Figure 6A:
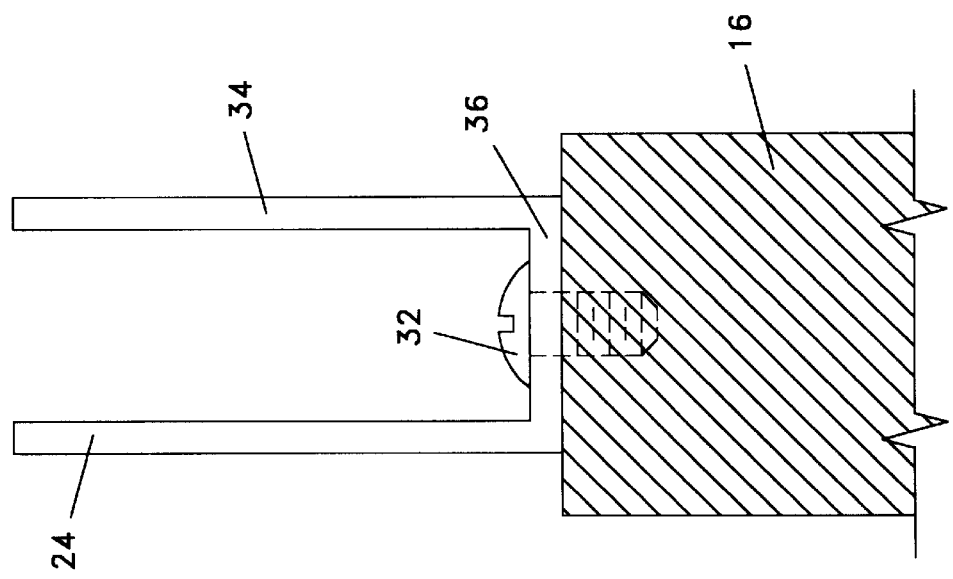
Figure 8:
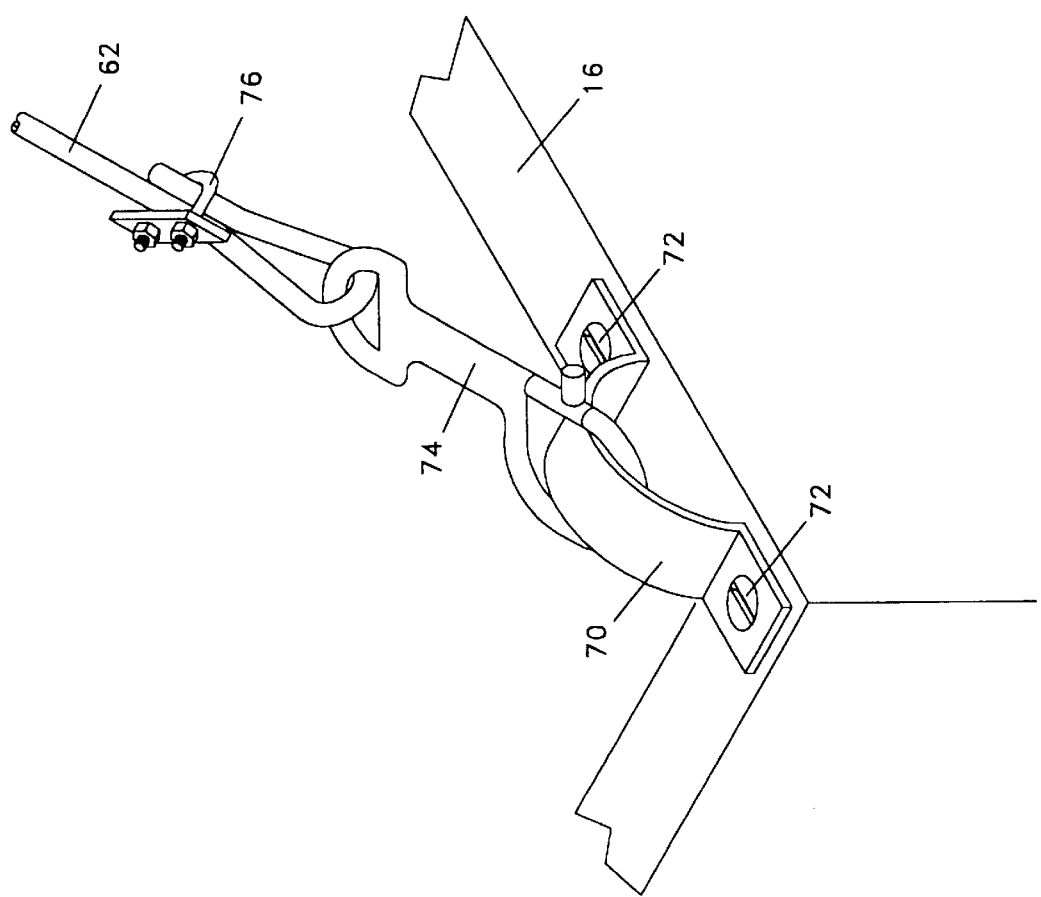
FIG. 8 is an enlarged side view taken along line 8—8 of FIG. 5 showing the attachment of a cable of the present invention by a preferred means.

In FIG. 5, the preferred location of the pivot base 24 is denoted by line 6—6. FIGS. 6A and 6B show the preferred alternative pivot bases 18, 20, 22, and 24. The pivot base shown in FIG. 6A is adapted for use on boats 2 having flat side rails 16 and consists of a u-shaped pivot base 34 having a flat bottom 36 that abuts the side rail when attached.

Alternatively, the pivot base shown in FIG. 6B is adapted for use on boats having rounded side rails 16 and consists of a u-shaped pivot base 34 having a pair of flanges 38 that extend from each side of the base's bottom. The bottom of the pivot base and the flanges abut the rounded side rail causing the pivot base to be secure when mounted against a rounded side rail as shown.

A first front post 40 and second front post 42 are pivotally attached to the pivot bases 18 and 20 to which the front bow 12 is attached, and a first rear post 44 and second rear post 46 are pivotally attached to the pivot bases 22 and 24 to which the rear bow 14 is attached. Alternatively, the posts and bows could be arranged and pivotally attached to the sides of the boat separately. With the blind partially opened as illustrated in FIG. 1, the blind frame is partially collapsed as shown in FIG. 2. The first front post is in an upright position obliquely situated with the front bow, and the first rear post is in an upright position obliquely situated with the rear bow. A connecting means 48 connects the first front post 40 and first rear post 44 to cause the blind frame on the left side of the boat 2 to remain in a raised position as illustrated.

The length of the posts 40, 42, 44, and 46 largely determines the final height of the blind frame 4. Therefore, an advantage of the present invention is that the posts may be cut to their final length after selectively determining the desired height of the blind. The length is cut appropriately respective to the desired height of the blind and the distance between the front and rear pivot bases 18, 20, 22, and 24.

Figure 9:
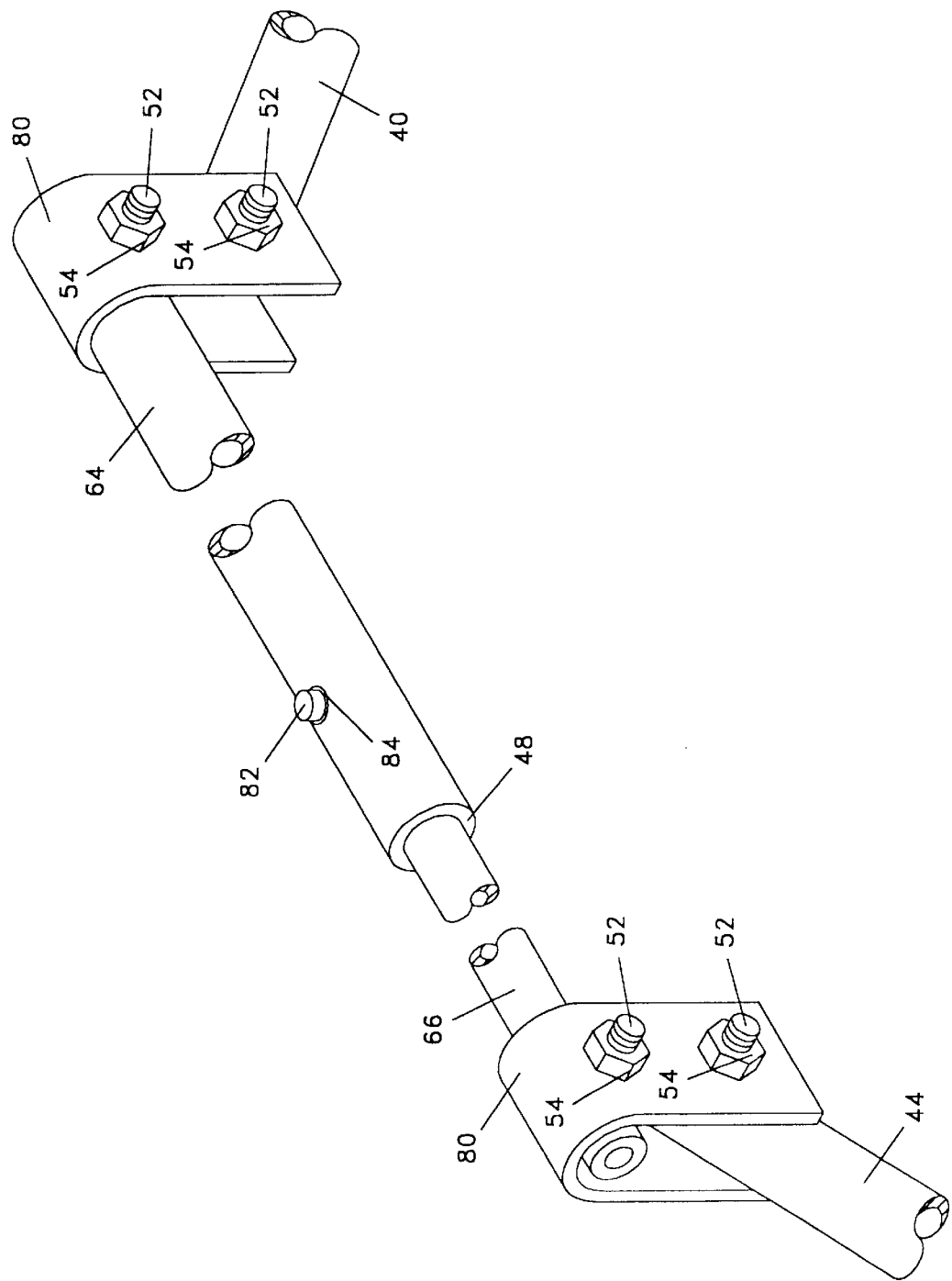
FIG. 9 is an enlarged fragmentary side view taken along line 9—9 of FIG. 5 showing the slide assembly of the present invention.

In general, four cables or similar flexible cordlike materials 56, 58, 60, and 62 attach to the posts 40, 42, 44, and 46. The cables then attach to the bows 12 and 14 and are tautly secured to the front and rear of the boat 2 to support the bows 12 and 14 in upright positions when the connecting means 48 connects the front and rear posts. One example of how the cables or like may specifically be secured is shown in FIGS. 5 and 7 disclosing the preferred means of practicing the present invention, but this example should not be construed to exclude other variations thereof such as rope, cord, wire, or other means for securing the bows and posts and providing tension between them. Cables 56 and 58 attach to the front posts. Cables 60 and 62 attach to the ends fo the rear posts. A hold-down bracket 68 is attached to each bow corner. The cables each run to the nearest bow corner as shown in FIG. 5 and are fed under the respective hold-down plate twice as shown in the enlarged view of FIG. 7. The cables 56 and 58 run from the front posts to the front bow and loop around the bow corner then run to eye straps 70 at the front of the boat 2. The eye straps as shown in FIG. 9 are mounted to the front and rear corners of the boat using screws 72. The cables are attached to the eye straps by placing the cable through the eye hole and then clamping the cable to itself using a snap buckle 74 and a cable clamp 76.

Another advantage of the present invention is that the length of the cables 56, 58, 60, and 62 may be determined and set to their final length after determining the desired height and overall size of the blind. Setting the length of the cables 56, 58, 60, and 62 is done by raising the bows 12 and 14 to the height of the posts 40, 42, 44, and 46 when the posts are connected by the connection means 48 as shown in FIG. 9. Once the bows are raised to the correct height, the cables are stretched between the posts and bows to a taut position.

The preferred connecting means 48 consists of a slide assembly as depicted in FIGS. 2 and 9. In the fully raised position the slide assembly is joined as illustrated in FIG. 9. A front slide member 64 is pivotally connected to the front post 40 via a bracket 80. A rear slide member 66 is pivotally connected to the rear post 44 via another bracket 80. One manner of pivotally connecting the slide members 64 and 66 and posts 40, 42, 44, and 46 to the brackets is to use machine screws 52 and nuts 54 as shown in FIG. 9.

In the described embodiment, the front slide member has a smaller diameter than the rear slide member and includes a snap button 82 near the end opposite the end connected to the post. The rear slide member is tubular and includes a hole 84 drilled through the slide member near the end opposite the attached end for receiving the snap button. When the slide members are connected, the front slide member is received within the rear slide member until the snap button engages the hole of the rear slide member and locks into place. The slide members may be separated by using a finger to press the snap button and disengage the snap button of the front slide member from the hole of the rear slide member, thus allowing the front and rear posts to become disconnected. When disconnected on one side of the boat, connecting members 64 and 66 are in a relaxed position resting against the front and rear bows as illustrated in FIGS. 1 and 2 in which the slide assembly is disconnected on the right side of the boat. Other means could be used connecting the posts and maintaining them in upright position. One example would be to use longer posts and provide a means for connecting the posts at their ends to each other. However, any other equivalent means must be conducive to quickly disengaging and separating the the connection by hand while the blind is in use in order to satisfy the objectives of the present invention.

FIGS. 10 and 11 depict the relative positions of the bow 12 and post 42 with respect to the pivot base 20 when the blind frame 4 is in the lowered position as illustrated by FIG. 3 and raised position as illustrated by FIG. 6. In the raised position the front posts 40 and 42 are joined to the rear posts 44 and 46 by connecting the slide assembly members 64 and 66 and locking the connecting means 48 into place using the snap buttons 82. The front bow 12 is supported in a forward upwardly inclined position by the cables 56 and 58 that are pulled taut between the eye straps 70, the front bow, and the front posts. A resistive tension is applied by the cables 60 and 62 that are pulled taut between the eye straps, the rear bow 14, and the rear posts. Similarly, the solid line position of the rear bow depicts the rear bow being supported in a rearward upwardly inclined position by the cables 60 and 62.

In the partially collapsed state illustrated in FIGS. 1 and 2, one of the slide assemblies 48 is disconnected by disengaging the snap button 82 of the front slide member 64 from the hole 84 in the rear slide member 66. The posts on the side in which the slide assembly is disconnected and the blind frame 4 is collapsed are in a relaxed position resting against the bows 12 and 14 as shown in FIG. 2. The relaxed front post 42 rests against the front bow 12. The relaxed rear post 46 rests against the rear bow 14 in a similar manner. The positions of the front and rear bows remains unchanged when the blind frame is partially collapsed.

In the fully collapsed state illustrated in FIGS. 3 and 4, both of the connecting means 48 are disconnected by disengaging the snap buttons 82 of the front slide members 64 from the holes 84 in the rear slide members 66. The posts and bows are in relaxed positions resting against the sides 16 of the boat 2. The front bow 12 and front posts 40 and 42 are laid toward the front of the boat. The rear bow 14 and rear posts 44 and 46 are laid flat on the sides of the boat in a similar manner but resting toward the rear of the boat as shown in FIG. 3.

The rear portion 8 and front portion 10 of the covering material 6 are attached to the blind frame 4 using a plurality of nylon straps 86 or other suitable means including rope or string. As described above, eye straps 70 are mounted at each location shown in FIG. 5 with the cables 56, 58, 60, and 62 terminating at the corners of the boat. The nylon straps or like may attach the covering material to means provided on the sides of the boat 2 or a standard snap buckle may be attached to each eye strap with rope attached and stretched along each side 16 of the boat 2 for attaching the covering material 6 at the sides to the rope.

The front portion 10 of the covering material 6 is attached to the front slide members 64, front bow 12, and the cables 56 and 58 on the front half of the blind frame 4. The remaining rear covering portion 8 is pulled over the front covering portion to create an overlap and is then attached to the rear slide members 66, rear bow 14, and the cables 60 and 62 on the rear half of the blind frame 4.

The type of camouflage covering material used is not critical to the present invention. In fact, a benefit of the present invention is that most any camouflage material can be adapted for use with the blind frame, thus permitting the hunter to adapt the camouflage for the particular hunting environment.

In the fully collapsed condition shown in FIG. 3, both slide assemblies 48 are disconnected. The front and rear bows 12 and 14, respectively, lie down flat against the sides 16 of the boat 2 with the cross member 28 of the front bow lying toward the fore of the boat and the cross member 26 of the rear bow lying toward the aft of the boat. The posts 40, 42, 44, and 46 and slide assembly members 64 and 66 lie flat to rest against the bows. When the blind frame is fully collapsed the rearward and forward covering materials 8 and 10, respectively, are neatly folded out of the way by the action of the blind frame 4 lying in a lowered position, as depicted in FIG. 4.

We claim:

1. A collapsible blind for being attached to a boat; said boat having front and rear ends and right and left side rails; said blind comprising:

a front bow pivotally attached to the side rails for forward and rearward vertical pivoting movement about a horizontal axis between a first blind down position and a second blind opened position;

a rear bow pivotally attached to the side rails for forward and rearward vertical pivoting movement about a horizontal axis between a first blind down position and a second blind opened position;

a pair of front posts each pivotally attached to each side rail for forward and rearward vertical pivoting movement;

a pair of rear posts each pivotally attached to each side rail for forward and rearward vertical pivoting movement;

a pair of connecting means attached to the respective front post and the respective rear post for connecting the posts in a supportive upright position;

a means for manually connecting and disconnecting each connecting means;

a securing means for providing tension between the front bow and front angle posts and the rear bow and rear angle posts when the connecting means are connected to hold the bows and angle posts in relative fixed positions;

a blind material;

a means for attaching the blind material to the boat and to one or more of the bows, the angle posts, the slide assemblies, or the securing means.

2. A collapsible blind for being attached to a boat as claimed in claim 1 in which said pair of connecting means comprises a pair of slide assemblies each having a first slide assembly member attached to the respective front angle post and a second slide assembly member attached to the respective rear angle post.

3. A collapsible blind for being attached to a boat as claimed in claim 2 in which said means for manually connecting and disconnecting each connecting means includes a manually depressible snap button on said first slide assembly member that fits within a snap button hole on said second slide assembly member such that each respective first and second slide assembly member may be manually connected and disconnected from each other by depressing the snap button.

4. A collapsible blind for being attached to a boat as claimed in claim 1 in which said securing means includes a first and second cable attached to each of the front posts, the front bow, and the front of the boat; and further includes a third and fourth cable attached to each of the rear posts, the rear bow, and the rear of the boat.

5. A collapsible blind for being attached to a boat; said boat having front and rear ends and right and left side rails; said blind comprising:

(a) a first pair of pivot bases, each pivot base respectively secured to each side rail in transversely aligned relation;

(b) a second pair of pivot bases, each pivot base respectively secured to each side rail in transversely aligned relation and positioned distally separate from the first pair of pivot bases;

(c) a front bow pivotally attached to the first pair of pivot bases for forward and rearward vertical pivoting movement about a horizontal axis between a first blind down position and a second blind opened position;

(d) a rear bow pivotally attached to the second pair of pivot bases for forward and rearward vertical pivoting movement about a horizontal axis between a first blind down position and a second blind opened position;

(e) a pair of front angle posts, each front angle post respectively pivotally attached to each of the first pair of pivot bases for forward and rearward vertical pivoting movement;

(f) a pair of rear angle posts, each rear angle post respectively pivotally attached to each of the second pair of pivot bases for forward and rearward vertical pivoting movement;

(g) a pair of slide assemblies each having a first slide assembly member attached to the respective front angle post and a second slide assembly member attached to the respective rear angle post;

(h) a means for manually connecting and disconnecting the first slide assembly member of each slide assembly to the second slide assembly member;

(i) a means for securing the front bow and front angle posts in position relative to the rear bow and rear angle posts when the slide assembly members are connected;

(j) a blind material;

(k) a means for attaching the blind material to the structure created by the bows, posts, and slide assemblies.

* * * * *